United States Patent
Kim

(10) Patent No.: US 7,721,839 B2
(45) Date of Patent: May 25, 2010

(54) OPERATOR'S SEAT FOR HEAVY EQUIPMENT HAVING OPTIMIZED SWITCH ARRANGEMENTS FOR CONTROLLING THE EQUIPMENT

(75) Inventor: Hak Shin Kim, Masan (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 18 days.

(21) Appl. No.: 12/164,314

(22) Filed: Jun. 30, 2008

(65) Prior Publication Data

US 2009/0008169 A1 Jan. 8, 2009

(30) Foreign Application Priority Data

Jul. 6, 2007 (KR) .................. 10-2007-0067992

(51) Int. Cl.
*B60K 26/00* (2006.01)

(52) U.S. Cl. ............... 180/315; 180/326; 180/329; 180/330; 180/331; 180/333; 180/335; 180/336

(58) Field of Classification Search ............ 180/315, 180/326, 327, 329, 330, 331, 335, 333, 336
See application file for complete search history.

(56) References Cited

U.S. PATENT DOCUMENTS

| | | | | |
|---|---|---|---|---|
| 4,699,239 A | * | 10/1987 | Ishino et al. ............. | 180/315 |
| 5,938,282 A | * | 8/1999 | Epple ..................... | 297/217.3 |
| 6,450,284 B1 | * | 9/2002 | Sakyo et al. ............. | 180/329 |
| 7,032,703 B2 | * | 4/2006 | Wulfert et al. ........... | 180/329 |
| 7,389,845 B2 | * | 6/2008 | Longueville et al. ...... | 180/326 |

* cited by examiner

*Primary Examiner*—Eric Culbreth
(74) *Attorney, Agent, or Firm*—Ladas & Parry LLP

(57) ABSTRACT

An operator's seat for heavy equipment having optimized switch arrangements for controlling the equipment is provided, in which arrangements of various kinds of switches and components of operating devices that are frequently used by an operator in the seat due to the characteristic of the equipment are integrated within a radius that an operator's hand reaches (i.e. in a hand arm operation zone), and thus physical inconvenience and fatigue that the operator who repeatedly operates working devices for a long time suffers can be reduced. The operator's seat for heavy equipment includes a switch instrument installed within a radius that a hand of an operator sitting in the operator's seat reaches, a control lever mounted on a specified position of the switch instrument to control operations of working devices, and switches arranged on the switch instrument in closest proximity to the control lever so that the operator in the operator's seat can operate the switches in the closest position in which the operator does not invade a control stroke zone of the control lever.

3 Claims, 4 Drawing Sheets

OPERATOR'S SEAT FOR HEAVY EQUIPMENT HAVING OPTIMIZED SWITCH ARRANGEMENTS FOR CONTROLLING THE EQUIPMENT

CROSS-REFERENCE TO RELATED APPLICATION

This application is based on and claims priority from Korean Patent Application No. 10-2007-0067992, filed on Jul. 6, 2007 in the Korean Intellectual Property Office, the disclosure of which is incorporated herein in its entirety by reference.

BACKGROUND OF THE INVENTION

1. Field of the invention

The present invention relates to an operator's seat for heavy equipment having optimized switch arrangements for controlling the equipment, in which various kinds of switches that are frequently operated by an operator sitting in the operator's seat are arranged in closest proximity to a control lever within a range in which the switches do not interfere with the control lever in operation, and thus physical inconvenience and fatigue that the operator who operates the corresponding switches for a long time suffers can be reduced.

More particularly, the present invention relates to an operator's seat for heavy equipment having optimized switch arrangements for controlling the equipment, in which arrangements of various kinds of switches and components of operating devices that are frequently used by an operator in the seat due to the characteristic of the equipment are integrated within a radius that an operator's hand reaches (i.e. in a hand arm operation zone), and thus physical inconvenience and fatigue that the operator who repeatedly operates working devices for a long time suffers can be reduced.

2. Description of the Prior Art

As illustrated in FIG. 1, according to a conventional operator's seat for heavy equipment, an ash tray 3 is detachably installed on a front surface of a console box 2 on which a control lever 1, and a cup holder 6 for receiving a beverage container (e.g., a soda can, a water bottle, or the like) is installed on a side panel 5 of a cab.

An engine RPM mode switch 7 and various kinds of operating switches 8 are installed on the side panel 5, and a display mode switch 9 and an instrument cluster 10 are installed on the console box 2.

The cup holder 6, which is arranged in front of the control lever 1, is positioned outside a hand arm operation zone (which is a zone where operator's arm and hand are situated when an operator extends his/her arm to operate the above-described switches).

Accordingly, if the operator who sits in the seat extends his/her arm to pick up a soda can placed in the cup holder 6, a part of the operator's body may touch the control lever 1 and so on through the operator's carelessness, and this may cause a corresponding working device to operate contrary to the operator's intention.

In addition, since the display mode switch 9 and the instrument cluster 10 are arranged in a body on the console box 2, the operator sitting in the seat 4 should lower his/her head to confirm and operate the display mode switch 9 and the instrument cluster 10 whenever he/she changes a working mode of the equipment.

Specifically, due to the conventional switch arrangements and the characteristic of the equipment that repeats the same work for a long time, the operator should repeatedly operate the corresponding switches of the equipment with feeling of physical inconvenience, and this causes the operator fatigue to be increased and the working efficiency to be lowered.

SUMMARY OF THE INVENTION

Accordingly, the present invention has been made to solve the above-mentioned problems occurring in the prior art while advantages achieved by the prior art are maintained intact.

One object of the present invention is to provide an operator's seat for heavy equipment having optimized switch arrangements for controlling the equipment, in which arrangements of various kinds of switches and components of operating devices that are frequently used by an operator in the seat due to the characteristic of the equipment are integrated within a radius that an operator's hand reaches, and thus physical inconvenience and fatigue that the operator who operates the corresponding switches suffers can be minimized.

In order to accomplish these objects, there is provided an operator's seat for heavy equipment having optimized switch arrangements for controlling the equipment, according to the present invention, which includes a switch instrument installed within a radius that a hand of an operator sitting in the operator's seat reaches; a control lever mounted on a specified position of the switch instrument to control operations of working devices; and switches arranged on the switch instrument in closest proximity to the control lever so that the operator in the operator's seat can operate the switches in the closest position in which the operator does not invade a control stroke zone of the control lever.

In a preferred embodiment of the present invention, the switches may include at least one of an engine RPM mode switch, operating switches of the equipment, and a display mode switch.

The operator's seat for heavy equipment according to the present invention may further include a cup holder installed in a specified position of the switch instrument.

The control lever and the switches may be installed in a hand arm operation zone of the operator in the operator's seat.

The control lever may be mounted on the switch instrument toward the operator in the operator's seat, the engine RPM mode switch may be arranged on the right side of the control lever, the operating switches may be arranged in front of the engine RPM mode switch, and the display mode switch may be arranged at the rear of the engine RPM mode switch.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 3:
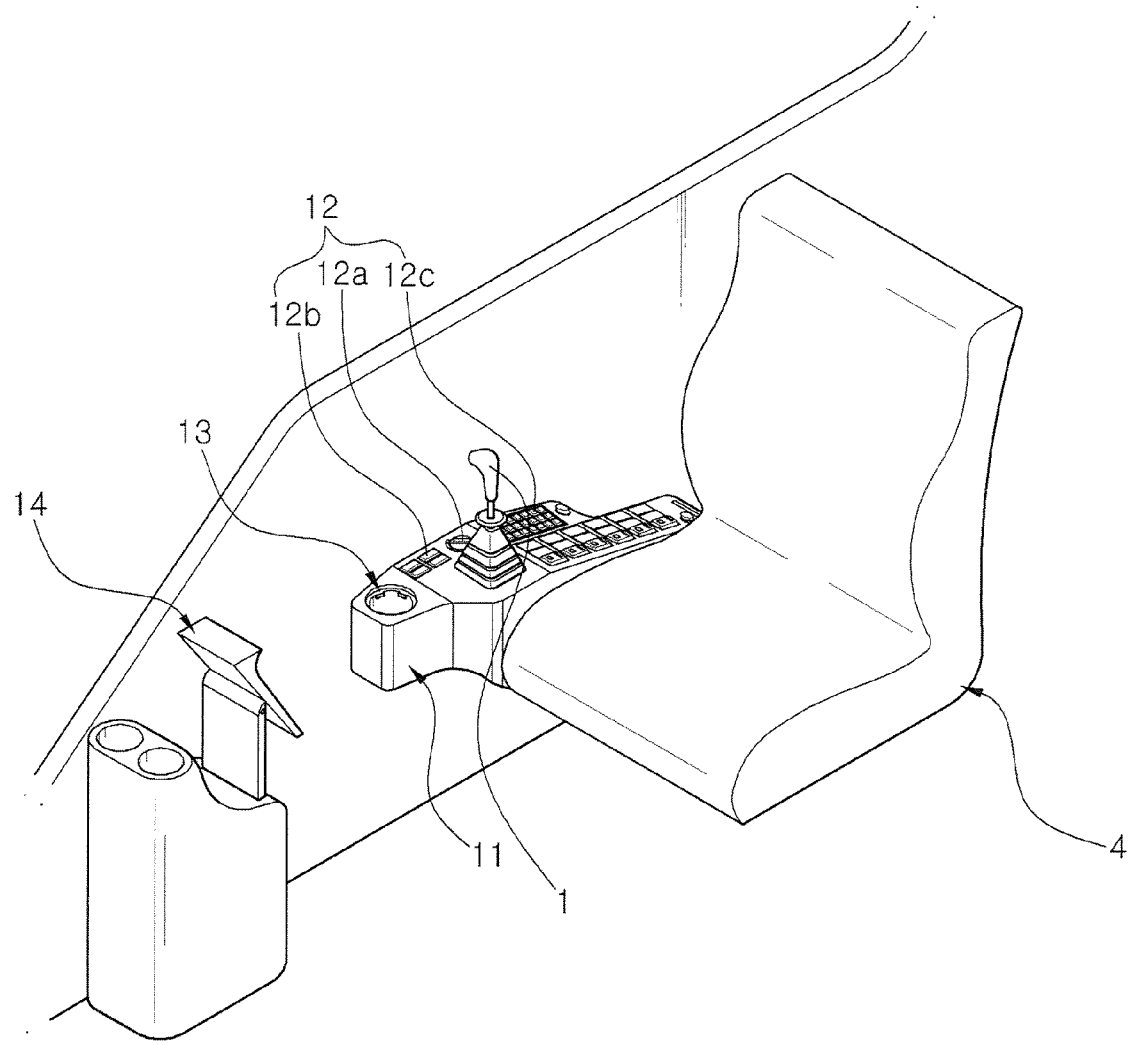
FIG. 3 is a schematic view explaining a zone in which operating devices, which are frequently operated by an operator in an operator's seat for heavy equipment having optimized switch arrangements for controlling the equipment, are arranged according to an embodiment of the present invention.
Figure 4:
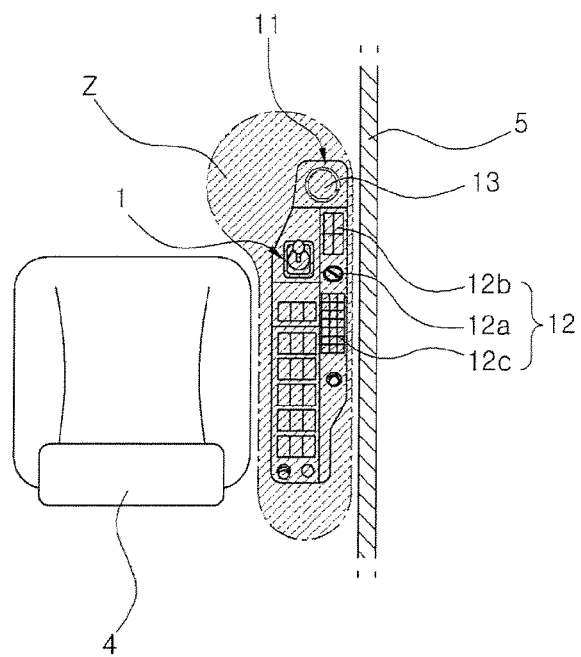
FIG. 4 is a plan view explaining an optimum position in which switches, which are frequently operated by an operator in an operator's seat for heavy equipment having optimized switch arrangements for controlling the equipment, are arranged according to an embodiment of the present invention.

As shown in FIGS. 2 to 5, an operator's seat for heavy equipment having optimized switch arrangements for controlling the equipment according to the present invention includes a switch instrument 11 installed within a radius that a hand of an operator sitting in the operator's seat 4 reaches (i.e. in a hand arm operation zone Z as indicated in FIG. 4); a control lever (RCV lever) mounted on a specified position of the switch instrument 11 to control operations of working devices such as a boom, an arm, and the like; and various kinds of switches 12 arranged on the switch instrument 11 in closest proximity to the control lever 1 so that the operator in the operator's seat 4 can operate the switches 12 in the closest position in which the operator does not invade a control stroke zone of the control lever 1.

In a preferred embodiment of the present invention, the switches 12 include at least one of an engine RPM mode switch 12a, operating switches 12b of the equipment, and a display mode switch 12c.

The operator's seat 4 for heavy equipment according to the present invention further includes a cup holder 13 installed in a specified position of the switch instrument 11 to receive therein a soda can, a water bottle, or the like.

The control lever 1 and the switches 12 are installed in a hand arm operation zone Z of the operator in the operator's seat 4.

The control lever 1 is mounted on the switch instrument 11 toward the operator in the operator's seat 4, the engine RPM mode switch 12a is arranged on the right side of the control lever 1, the operating switches 12b are arranged in front of the engine RPM mode switch 12a, and the display mode switch 12c is arranged at the rear of the engine RPM mode switch 12a.

Hereinafter, the features of the operator's seat for heavy equipment having optimized switch arrangements for controlling the equipment according to an embodiment of the present invention will be described in detail with reference to the accompanying drawings.

Figure 5:
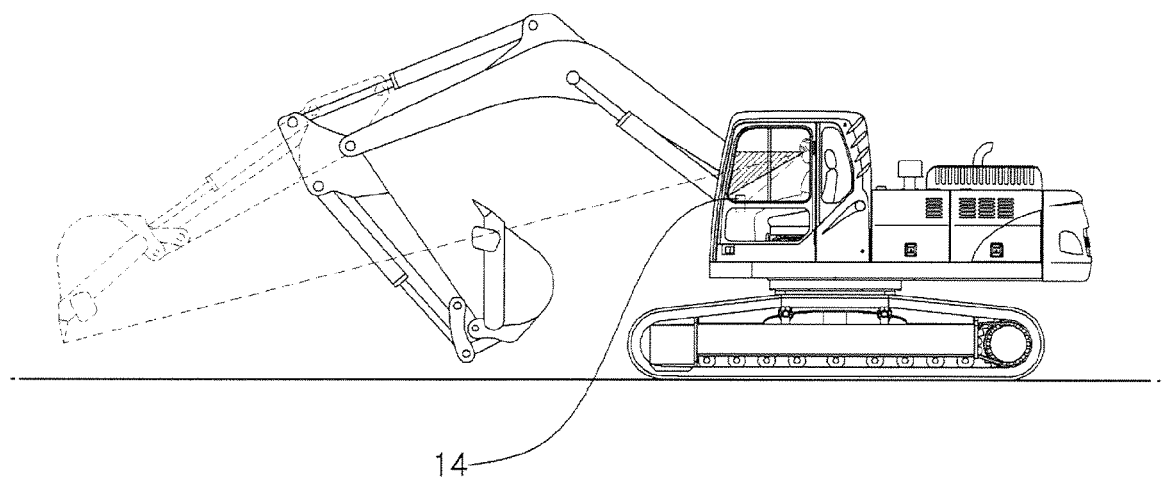
FIG. 5 is a view illustrating an operator's seat for heavy equipment having optimized switch arrangements for controlling the equipment in a used state according to an embodiment of the present invention.

As shown in FIGS. 3 to 5, the heavy equipment such as an excavator possesses the characteristics that it repeats the same working mode for a long time in the same working place. In this case, the operator sitting in the operator's seat drives working devices such as a boom and so on by easily operating the control lever 1 and various kinds of switches 12 mounted on the switch instrument 11 that is installed within a radium that the operator's hand reaches, so that an excavating work is repeatedly performed.

Accordingly, even in the case of repeatedly performing the same working mode for a long time (e.g., 10 hours a day on average), the physical inconvenience and fatigue that the operator in the operator's seat feels due to the operation of various kinds of switches of the equipment can be minimized. Accordingly, convenience is provided to the operator and the workability of the equipment is maximized.

Also, in the case of performing the work for a long time without seceding from the operator's seat, the operator can easily use a water bottle and so on received in the cup holder 13 installed in front of the switch instrument 11. That is, since the switch instrument 11 is installed within a radius Z that the hand of the operator in the operator's seat reaches, the operator can easily draw out the water bottle and so on received in the cup holder 13 by extending his/her arm during working.

As illustrated in FIGS. 3 and 4, the switch instrument 11 in which the control lever 1 and various kinds of switches 12 that are frequently operated by the operator in the operator's seat while working is installed in the optimal position in the radius that the operator's hand can reach.

That is, since the switch instrument 11 is installed within the hand arm operation zone of the operator in the operator's seat, the fatigue that the operator feels is reduced even in the case where the operator repeatedly operates the control lever 1 and the switches 12 for a long time.

In this case, the switches 12 are arranged in closest proximity to the control lever 1 without invading the control stroke zone of the control lever 1 (i.e., the switches 12 are arranged in a specified position in closest proximity to the control lever 1 as they get out of the stroke zone of the control lever 1). Accordingly, the operator's body is prevented from touching the control lever 1 through the operator's carelessness when the operator in the operator's seat operates the switches 12, and this causes the corresponding working device to operate contrary to the operator's intention.

As illustrated in FIG. 5, even in the case where the operator frequently changes the working mode through the instrument cluster 14 mounted on a specified region in front of the switch instrument 11, it is not required for the operator in the operator's seat to lower his/her head to confirm the display mode switch 12c.

Figure 1:
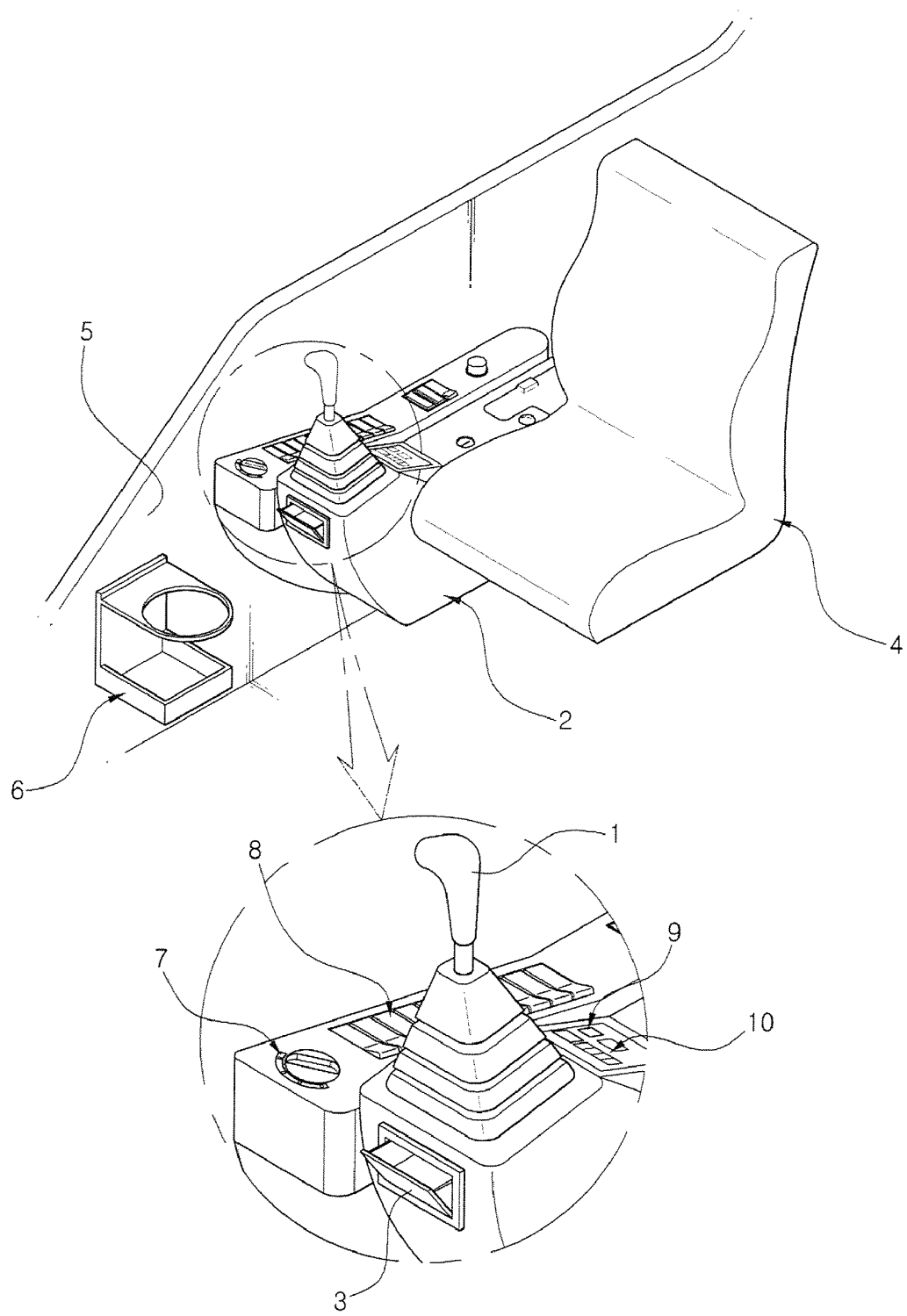
FIG. 1 is a view illustrating a cup holder and various kinds of switches installed in the neighborhood of a conventional operator's seat for heavy equipment.
Figure 2:
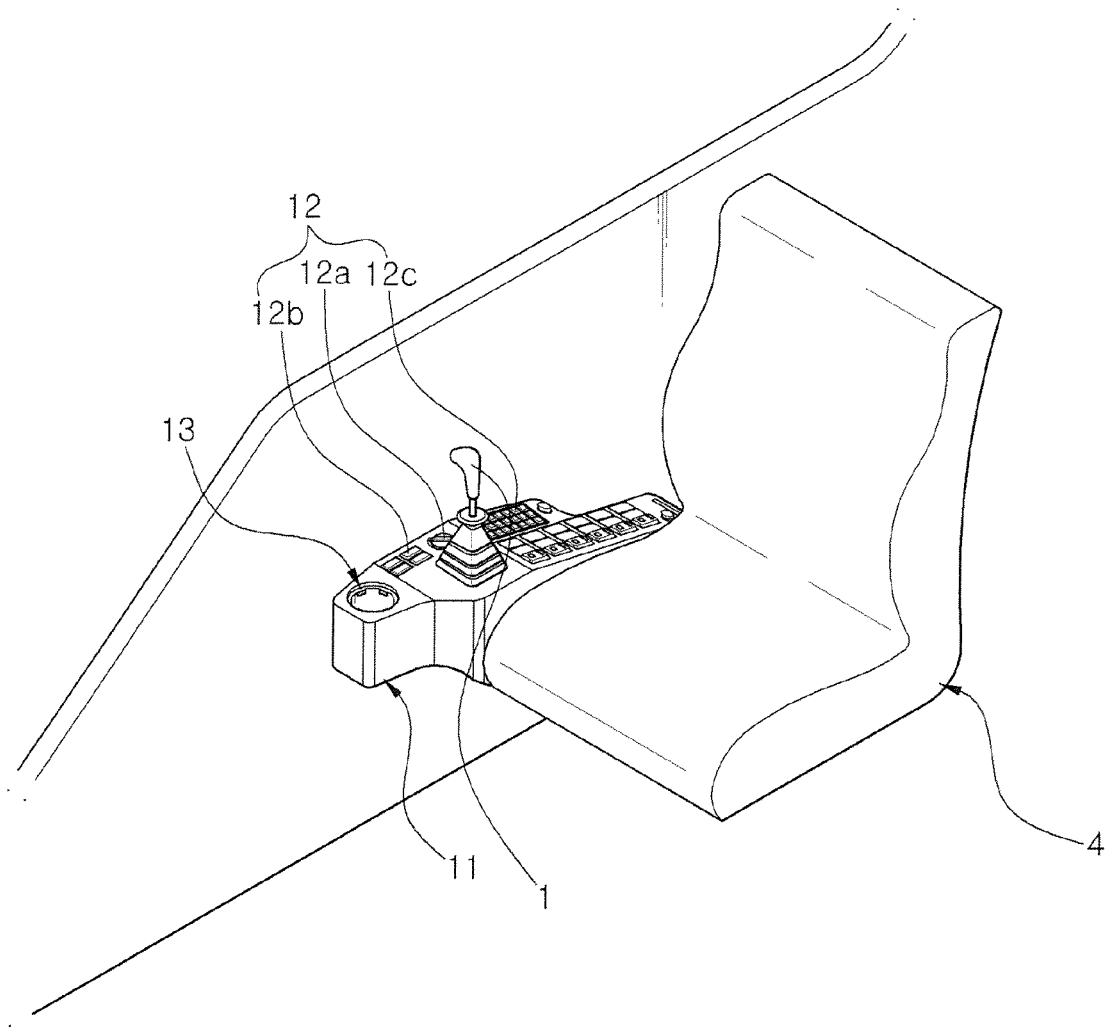
FIG. 2 is a partial perspective view of an operator's seat for heavy equipment having optimized switch arrangements for controlling the equipment according to an embodiment of the present invention.

That is, even in the case where the operator in the operator's seat looks at the front working device (e.g., a bucket), the instrument cluster 14 comes into sight of the operator. Accordingly, the operator can confirm the display state of the instrument cluster 14 as he/she looks at the front working device. By contrast, according to the conventional operator's seat, the operator sitting in the seat 4 should lower his/her head to confirm and operate the display mode switch 9 as illustrated in FIG. 1, and this causes operator fatigue to be increased.

As described above, an operator's seat for heavy equipment having optimized switch arrangements for controlling the equipment according to the embodiment of the present invention has the following advantages.

The arrangements of various kinds of switches and components of operating devices that are frequently used by an operator in the seat due to the characteristic of the equipment are integrated within a radius that an operator's hand reaches, and thus physical inconvenience and fatigue that the operator who operates the corresponding switches suffers can be minimized to improve the reliability of the equipment.

Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An operator's seat for equipment having optimized switch arrangements for controlling the equipment, comprising:
   a switch instrument installed within a radius that a hand of an operator sitting in the operator's seat reaches;
   a control lever mounted on a specified position of the switch instrument to control operations of working devices; and
   switches arranged on the switch instrument in close proximity to the control lever so that the operator in the operator's seat can operate the switches in a close position in which the operator does not invade a control stroke zone of the control lever,
   wherein the switches include at least an engine RPM mode switch, operating switches of the equipment, and a display mode switch
   and wherein the control lever is mounted on the switch instrument near the operator in the operator's seat, the engine RPM mode switch is arranged on the right side of the control lever, the operating switches are arranged in the front of the engine RPM mode switch, and the display mode switch is arranged at the rear of the engine RPM mode switch.

2. The operator's seat of claim 1, further comprising a cup holder installed in a specified position of the switch instrument.

3. The operator's seat of claim 1, wherein the control lever and the switches are installed in a hand arm operation zone of the operator in the operator's seat.

* * * * *